(12) United States Patent
Palmer, Jr. et al.

(10) Patent No.: US 12,174,129 B2
(45) Date of Patent: Dec. 24, 2024

(54) X-RAY TOMOGRAPHY SYSTEMS AND METHODS FOR IMAGING AN AIRCRAFT PART

(71) Applicant: The Boeing Company, Chicago, IL (US)

(72) Inventors: Donald Duane Palmer, Jr., Ballwin, MO (US); Thomas Anthony Maeder, Bothell, WA (US)

(73) Assignee: The Boeing Company, Arlington, VA (US)

( * ) Notice: Subject to any disclaimer, the term of this patent is extended or adjusted under 35 U.S.C. 154(b) by 304 days.

(21) Appl. No.: 17/697,259

(22) Filed: Mar. 17, 2022

(65) Prior Publication Data
US 2022/0349842 A1    Nov. 3, 2022

Related U.S. Application Data
(60) Provisional application No. 63/180,791, filed on Apr. 28, 2021.

(51) Int. Cl.
*G01N 23/046*   (2018.01)
*G01N 23/083*   (2018.01)

(52) U.S. Cl.
CPC ......... *G01N 23/046* (2013.01); *G01N 23/083* (2013.01); *G01N 2223/308* (2013.01); *G01N 2223/3303* (2013.01)

(58) Field of Classification Search
CPC ............... G01N 23/046; G01N 23/083; G01N 2223/308; G01N 2223/3303
See application file for complete search history.

(56) References Cited

U.S. PATENT DOCUMENTS

| 4,821,304 A | * | 4/1989 | Danos | G21K 1/025 |
| | | | | 976/DIG. 429 |
| 5,014,293 A | | 5/1991 | Boyd et al. | |

(Continued)

FOREIGN PATENT DOCUMENTS

EP    1985998 A1    10/2008

OTHER PUBLICATIONS

European Patent Office, Extended European Search Report for related European patent application EP 22 166 070, Aug. 1, 25, 2022.

(Continued)

*Primary Examiner* — Blake C Riddick
(74) *Attorney, Agent, or Firm* — Kolitch Romano Dascenzo Gates LLC

(57) ABSTRACT

X-ray tomography systems and methods for imaging an aircraft part are disclosed herein. The systems include a part fixture, which is configured to support the aircraft part. The systems also include an x-ray source, which is configured to selectively emit x-rays, and an x-ray detector, which is configured to detect the x-rays. The systems further include a support structure that operatively supports the x-ray source and the x-ray detector such that x-rays emitted by the x-ray source travel along a beam path that is incident upon the x-ray detector and that passes through the aircraft part. The systems also include a rotary scanning structure, which is configured to selectively rotate the support structure about a scan axis, and a longitudinal scanning structure, which is configured to selectively translate the support structure along the scan axis. The methods include methods of utilizing the systems.

20 Claims, 3 Drawing Sheets

(56) References Cited

U.S. PATENT DOCUMENTS

| | | | | |
|---|---|---|---|---|
| 5,237,598 | A * | 8/1993 | Albert | H04N 13/254 378/146 |
| RE36,415 | E * | 11/1999 | McKenna | A61B 6/035 378/198 |
| 7,227,924 | B2 * | 6/2007 | Zhou | H01J 35/147 378/10 |
| 8,094,781 | B1 * | 1/2012 | Safai | G01N 23/207 378/197 |
| 2005/0152501 | A1 * | 7/2005 | Sukovic | A61B 6/035 378/197 |
| 2005/0226361 | A1 * | 10/2005 | Zhou | G01N 23/046 378/4 |
| 2006/0023830 | A1 * | 2/2006 | Schomberg | A61B 6/027 378/4 |
| 2006/0056585 | A1 * | 3/2006 | Georgeson | G01N 23/083 378/57 |
| 2006/0138339 | A1 * | 6/2006 | Fang | H01L 31/115 250/389 |
| 2008/0144778 | A1 * | 6/2008 | Sonani | A61B 6/08 378/206 |
| 2008/0260093 | A1 | 10/2008 | Bontus | |
| 2009/0168964 | A1 * | 7/2009 | Safai | B64F 5/60 378/87 |
| 2011/0085636 | A1 * | 4/2011 | Dennerlein | A61B 6/587 378/4 |
| 2011/0103548 | A1 * | 5/2011 | Bendahan | G01N 23/203 378/57 |
| 2012/0074305 | A1 * | 3/2012 | Scholes | G01V 5/222 250/271 |
| 2013/0287169 | A1 * | 10/2013 | Liesenfelt | G21K 1/04 378/57 |
| 2014/0270059 | A1 * | 9/2014 | Suppes | G01N 23/046 378/20 |
| 2015/0208998 | A1 * | 7/2015 | Stoutenburgh | A61B 6/032 378/11 |
| 2016/0157329 | A1 * | 6/2016 | Kutra | G21K 1/025 378/138 |
| 2017/0020481 | A1 * | 1/2017 | Hawker | A61B 6/032 |
| 2017/0052125 | A1 * | 2/2017 | Georgeson | G01N 23/20025 |
| 2017/0079606 | A1 * | 3/2017 | Stoutenburgh | A61B 6/0407 |
| 2019/0125290 | A1 * | 5/2019 | Arai | A61B 6/545 |
| 2019/0282185 | A1 * | 9/2019 | Gregerson | A61B 6/4488 |
| 2019/0360948 | A1 * | 11/2019 | Lee | G01N 33/24 |
| 2019/0374178 | A1 * | 12/2019 | Bennett | A61N 5/1077 |
| 2020/0088655 | A1 * | 3/2020 | Nakayama | G01N 3/08 |
| 2021/0109039 | A1 * | 4/2021 | Rothe | G01N 23/046 |
| 2021/0196216 | A1 * | 7/2021 | Gregerson | A61B 6/03 |
| 2022/0050067 | A1 * | 2/2022 | Ebner | G01N 23/046 |
| 2022/0381705 | A1 * | 12/2022 | Makeev | G01N 23/046 |
| 2023/0390587 | A1 * | 12/2023 | Wong | A61N 5/1077 |

OTHER PUBLICATIONS

European Patent Office, Examination Report in related European Application No. EP 22 166 070, May 7, 2024.

* cited by examiner

X-RAY TOMOGRAPHY SYSTEMS AND METHODS FOR IMAGING AN AIRCRAFT PART

RELATED APPLICATION

The present application is a non-provisional of and claims priority to U.S. Provisional Patent Application No. 63/180,791, filed on Apr. 28, 2021, entitled "X-RAY TOMOGRAPHY SYSTEMS AND METHODS FOR IMAGING AN AIRCRAFT PART," the complete disclosure of which is incorporated by reference.

FIELD

The present disclosure relates generally to x-ray tomography systems and methods for imaging an aircraft part.

BACKGROUND

X-ray tomography has been utilized in industrial settings to image parts and/or components. While effective for certain parts and/or components, conventional x-ray tomography systems suffer from a number of significant disadvantages. As an example, the conventional industrial x-ray tomography systems generally rotate the component during imaging thereof, which may lead to undesired motion and/or flexing of the component during imaging. As another example, conventional industrial x-ray tomography systems generally are not capable of imaging an entirety of the component, or at least cannot do so without moving the component, for example due to component size and/or configuration. This motion of the component may lead to undesired decreases in a signal-to-noise ratio of the generated images and/or to undesired variability in the measurements. In addition, these motion issues are compounded for large and/or flexible components, such as many common aircraft parts. Thus, there exists a need for improved x-ray tomography systems and/or methods for imaging an aircraft part.

SUMMARY

X-ray tomography systems and methods for imaging an aircraft part are disclosed herein. The systems include a part fixture, which is configured to support the aircraft part in a desired orientation. The systems also include an x-ray source, which is configured to selectively emit x-rays, and an x-ray detector, which is configured to detect the x-rays. The systems further include a support structure that operatively supports the x-ray source and the x-ray detector such that x-rays emitted by the x-ray source travel along a beam path that is incident upon the x-ray detector and that passes through the aircraft part when the aircraft part is supported by the part fixture. The systems also include a rotary scanning structure, which is configured to selectively rotate the support structure about a scan axis, and a longitudinal scanning structure, which is configured to selectively translate the support structure along the scan axis.

The methods include supporting an aircraft part in a desired orientation with a part fixture and scanning the aircraft part. The scanning includes selectively rotating a support structure, which supports an x-ray source and an x-ray detector, about a scan axis such that a beam path from the x-ray source to the x-ray detector passes through the aircraft part. The scanning also includes selectively translating the support structure along the scan axis.

DESCRIPTION

Figure 1:
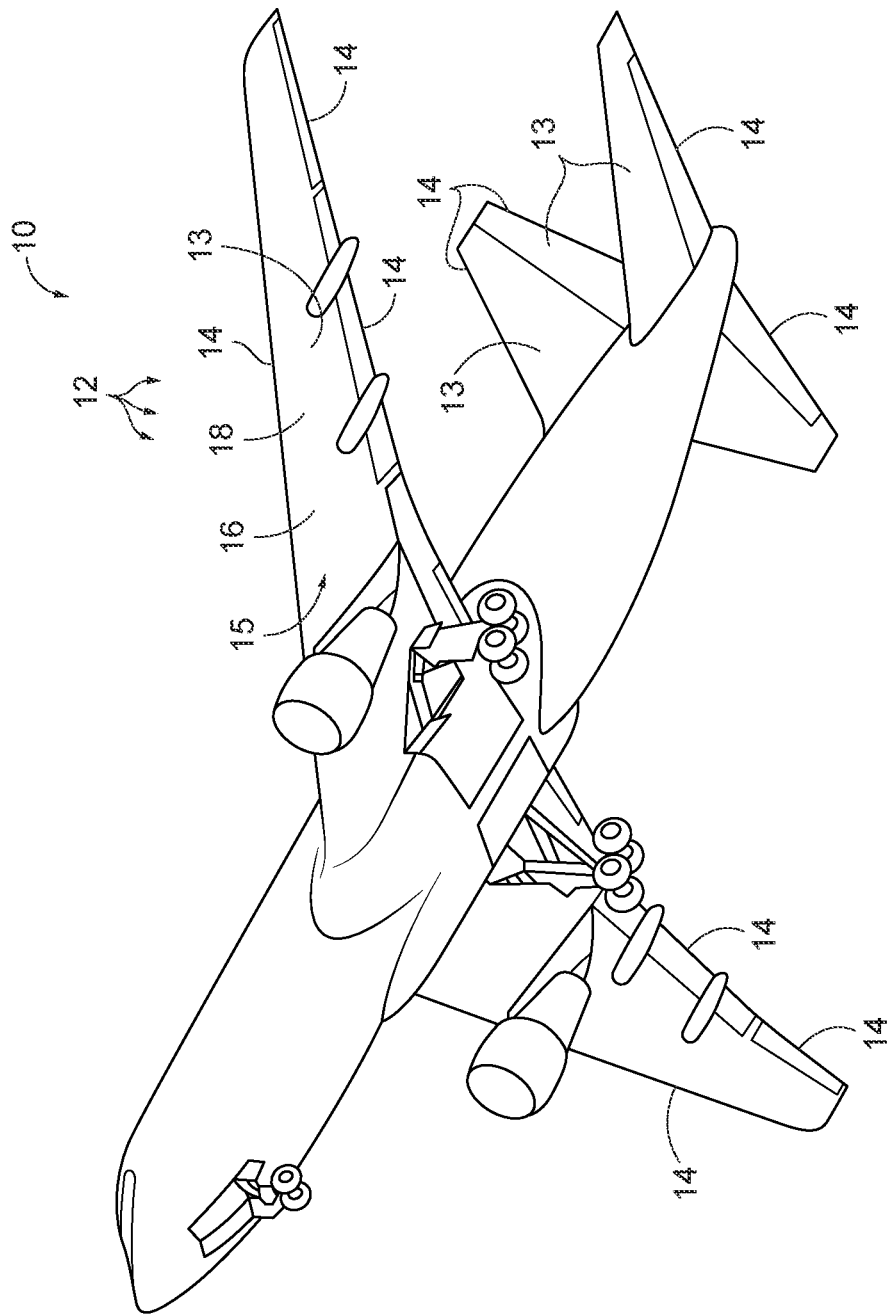
FIG. 1 is a schematic illustration of an aircraft that may include an aircraft part that may be imaged by x-ray tomography systems and/or methods, according to the present disclosure.

FIGS. 1-4 provide illustrative, non-exclusive examples of aircraft 10 that include aircraft parts 12 that may be imaged by x-ray tomography systems 30 and/or by methods 200, according to the present disclosure. Elements that serve a similar, or at least substantially similar, purpose are labeled with like numbers in each of FIGS. 1-4, and these elements may not be discussed in detail herein with reference to each of FIGS. 1-4. Similarly, all elements may not be labeled in each of FIGS. 1-4, but reference numerals associated therewith may be utilized herein for consistency. Elements, components, and/or features that are discussed herein with reference to one or more of FIGS. 1-4 may be included in and/or utilized with any of FIGS. 1-4 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic illustration of an aircraft 10. Aircraft 10 includes a plurality of aircraft parts 12, and any suitable one and/or number of aircraft parts 12 may be imaged by x-ray tomography systems 30 and/or utilizing methods 200, according to the present disclosure. This may include imaging aircraft part 12 prior to assembly of aircraft part 12 within aircraft 10 and/or imaging aircraft part 12 subsequent to assembly of aircraft 10. Examples of aircraft part 12 include an aerodynamic surface 13 and/or an edge structure 14 of aircraft 10.

Edge structure 14 also may be referred to herein as and/or may be an aircraft edge structure 14 and/or an advanced aircraft edge structure 14. Examples of edge structure 14 include a wing, a leading edge of the wing, a trailing edge of the wing, a tail, a leading edge of the tail, a trailing edge of the tail, a horizontal stabilizer, a leading edge of the horizontal stabilizer, a trailing edge of the horizontal stabilizer, a vertical stabilizer, a leading edge of the vertical stabilizer, and/or a trailing edge of the horizontal stabilizer.

Aircraft parts 12 may, in some examples, include and/or be composite aircraft parts 12. Such composite aircraft parts 12 also may be referred to herein as composite structures 12 that may be formed and/or defined by a fiber-reinforced composite material. The fiber-reinforced composite material may include and/or may be defined by a plurality of fibers 16 and a resin material 18.

Figure 2:
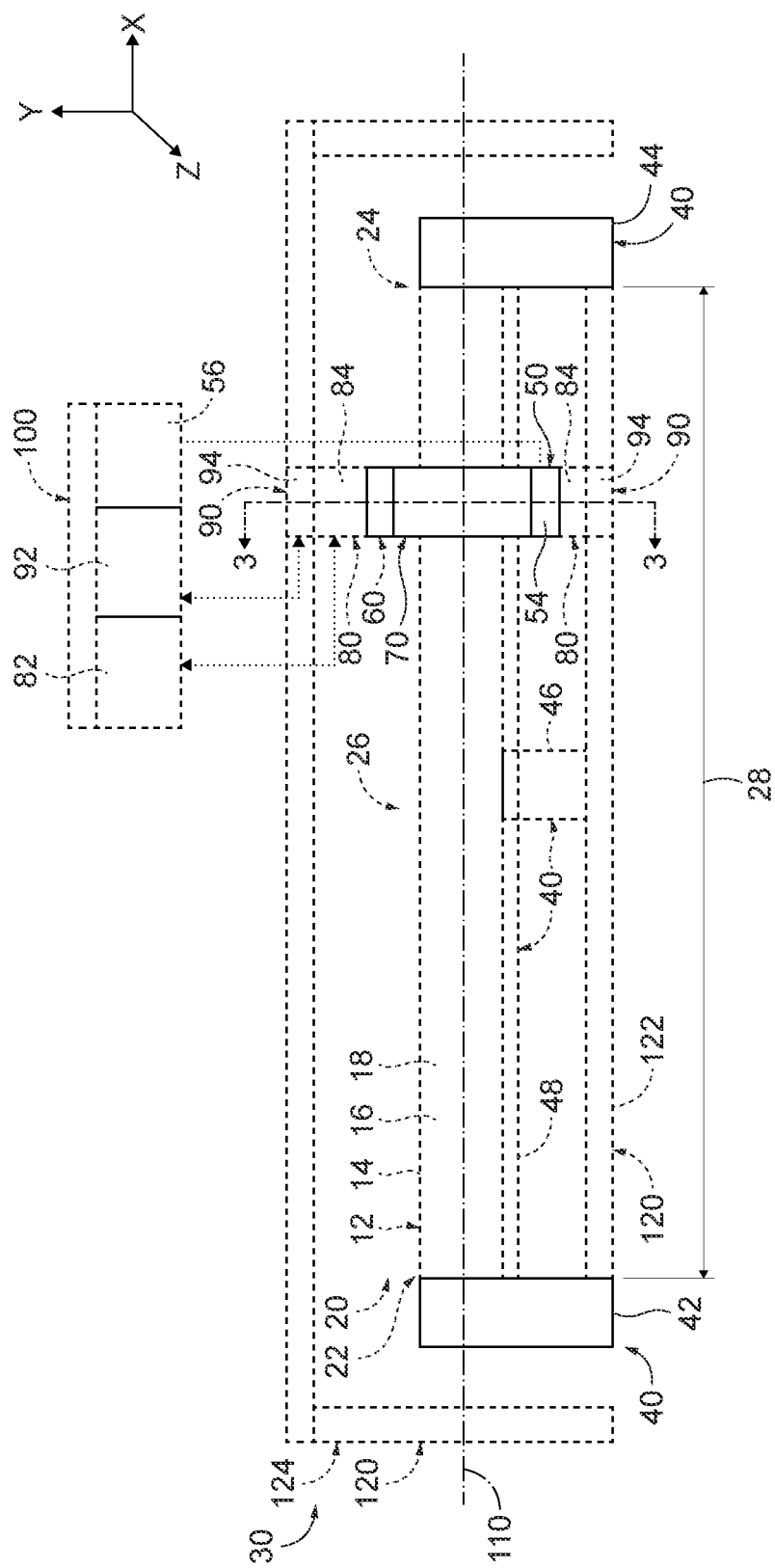
FIG. 2 is a schematic side view illustrating examples of an x-ray tomography system for imaging an aircraft part, according to the present disclosure.
Figure 3:
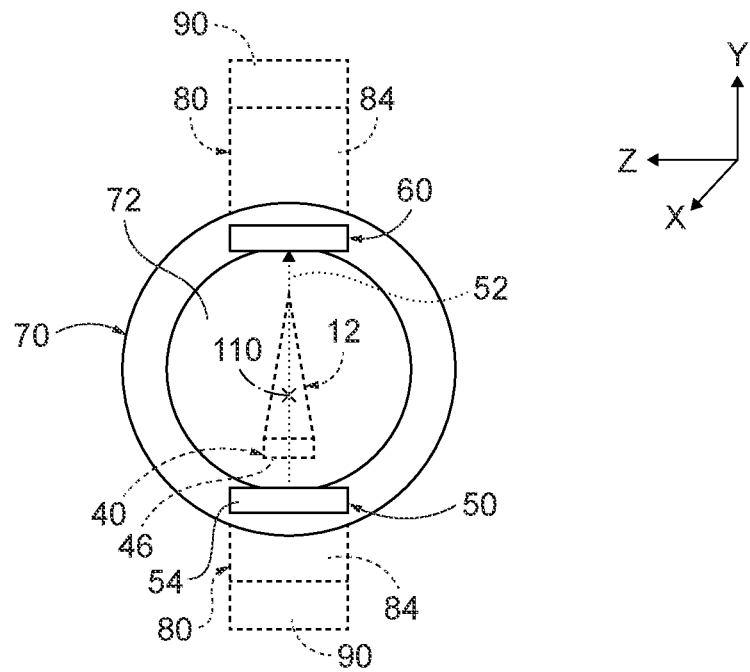
FIG. 3 is a schematic cross-sectional view of the x-ray tomography systems of FIG. 2 taken along line 3-3 of FIG. 2.

FIG. 2 is a schematic side view illustrating examples of x-ray tomography systems 30 for imaging an aircraft part 12, according to the present disclosure, and FIG. 3 is a schematic cross-sectional view of x-ray tomography systems 30 of FIG. 2, taken along line 3-3 of FIG. 2. X-ray tomography systems 30 also may be referred to herein as systems 30. As collectively illustrated by FIGS. 2-3, systems 30 include a part fixture 40, which may be configured to support, or hold, aircraft part 12 in desired orientation 20. In some examples, and as perhaps best illustrated in FIG. 2, desired orientation 20 may include and/or be a horizontal orientation. As a specific example, and with continued reference to FIG. 2, aircraft part 12 may include and/or be an elongate aircraft part 12, which may have and/or define an elongate axis 19. In such an example, elongate axis 19 may extend horizontally, or at least substantially horizontally.

Returning to FIGS. 2-3, systems 30 also include an x-ray source 50, which is configured to selectively emit x-rays, and an x-ray detector 60, which is configured to detect the x-rays. Systems 30 further include a support structure 70, which operatively supports both x-ray source 50 and x-ray detector 60. This operative support is such that x-rays emitted by x-ray source 50 travel along a beam path 52 that is incident upon x-ray detector 60 and that passes through aircraft part 12 when the aircraft part is supported by part fixture 40, as perhaps best illustrated in FIG. 3.

Systems 30 also include a rotary scanning structure 80 and a longitudinal scanning structure 90. Rotary scanning structure 80 may be configured to selectively rotate support structure 70 about a scan axis 110, and longitudinal scanning structure 90 may be configured to selectively translate support structure 70 along scan axis 110. In some examples, scan axis 110 may be horizontal, may be at least substantially horizontal, may be parallel to elongate axis 19, may be at least substantially parallel to elongate axis 19, and/or may extend coaxially with elongate axis 19.

Figure 4:
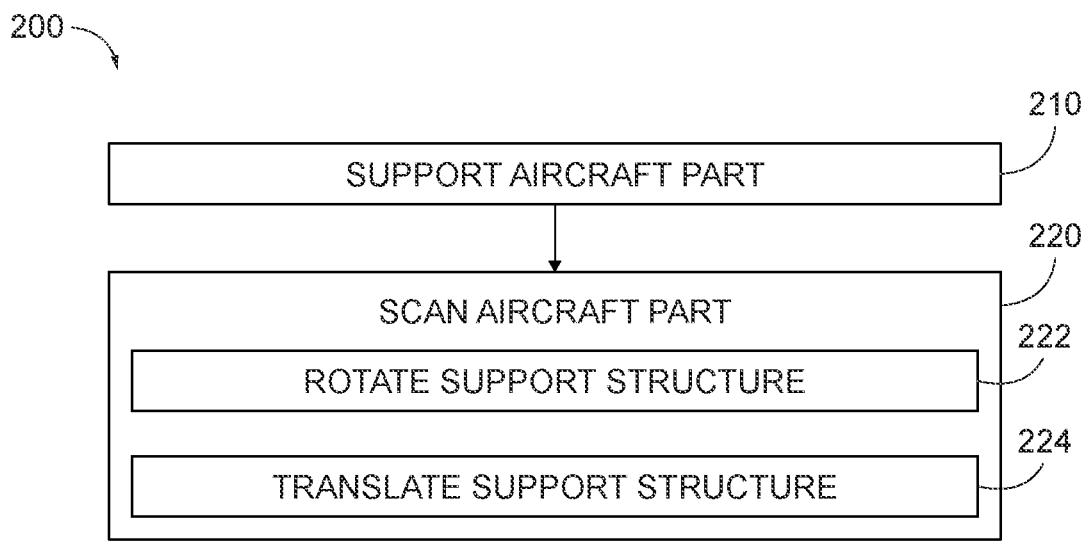
FIG. 4 is a flowchart depicting examples of methods of imaging an aircraft part, according to the present disclosure.

During operation, or operative use, of systems 30, and as discussed in more detail herein with reference to methods 200 of FIG. 4, aircraft part 12 may be supported by part fixture 40, such as by being attached to the part fixture by one or more fasteners and/or by resting on the part fixture under the influence of gravity. In addition, x-ray source 50 may emit x-rays along beam path 52, and the x-rays may travel through aircraft part 12 and be incident upon x-ray detector 60. Aircraft part 12 then may be scanned and/or imaged by systems 30. As an example, rotary scanning structure 80 and/or longitudinal scanning structure 90 may be utilized to selectively move support structure 70 relative to aircraft part 12, thereby selectively moving both x-ray source 50 and x-ray detector 60 relative to the aircraft part and/or selectively varying a region of the aircraft part through which beam path 52 extends. Variations in x-rays detected by x-ray detector 60 then may be utilized to generate two and/or three-dimensional images of aircraft part 12, such as via tomographic reconstruction.

It is within the scope of the present disclosure that part fixture 40 may be configured to support and/or to retain aircraft part 12 fixed, stationary, and/or immobile while the aircraft part is imaged by systems 30. This may provide significant benefits over conventional industrial x-ray tomography systems, which generally rotate a corresponding component during imaging thereof, as discussed herein. As an example, bending and/or flexing of aircraft part 12 when imaged by systems 30 may be significantly less when compared to conventional industrial x-ray tomography systems, thereby permitting systems 30 to produce more detailed, more accurate, and/or higher resolution images of the aircraft part when compared to the conventional industrial x-ray tomography systems.

Part fixture 40 may include any suitable structure that may be adapted, configured, designed, and/or constructed to support, or to operatively support, aircraft part 12 while the aircraft part is imaged by systems 30. In some examples, and as discussed, part fixture 40 may be adapted, configured, designed, and/or constructed to maintain aircraft part 12 fixed in space, stationary, and/or immobile, such as while rotary scanning structure 80 rotates support structure 70 about scan axis 110 and/or while longitudinal scanning structure 90 translates support structure 70 along scan axis 110. With this in mind, systems 30 may be configured to scan at least a threshold fraction of the volume of aircraft part 12 without motion of the aircraft part. Examples of the threshold fraction of the volume of aircraft part 12 include at least 60%, at least 65%, at least 70%, at least 75%, at least 80%, at least 85%, at least 90%, at least 95%, at least 99%, 100%, at most 100%, at most 95%, at most 90%, at most 85%, and/or at most 80%.

In some examples, part fixture 40 may be configured such that beam path 52 extends external to the part fixture while systems 30 scan at least a threshold fraction of a volume of aircraft part 12. Examples of the threshold fraction of the volume of the aircraft part include at least 60%, at least 65%, at least 70%, at least 75%, at least 80%, at least 85%, at least 90%, at least 95%, at least 99%, 100%, at most 100%, at most 95%, at most 90%, at most 85%, and/or at most 80%. Such a configuration may permit and/or facilitate scanning of aircraft part 12 without also scanning part fixture 40, which may decrease a potential for artifacts and/or noise in images of aircraft part 12 that are produced by systems 30.

As an example, and as illustrated in FIG. 2, aircraft part 12 may extend between a first part end region 22 and a second part end region 24. In some such examples, part fixture 40 may be configured to engage, to attach to, to be fastened to, and/or to support first part end region 22 and second part end region 24, or only first part end region 22 and only second part end region 24. Stated another way, and in some such examples, part fixture 40 may not support an intermediate region 26 of aircraft part 12, and/or intermediate region 26 may be unsupported by part fixture 40.

As another example, and with continued reference to FIG. 2, part fixture 40 may include at least one intermediate support 46. Intermediate support 46, when present, may be configured to engage, to attach to, to be fastened to, and/or to support intermediate region 26, which may be positioned between first part end region 22 and second part end region 24. In some such examples, intermediate support 46 may be configured to be moved and/or removed during scanning of aircraft part 12 by systems 30, thereby permitting and/or facilitating scanning of aircraft part 12 without also scanning intermediate support 46 of part fixture 40.

In some examples, and with continued reference to FIG. 2, part fixture 40 may extend along, or along an entirety of, a length 28 of aircraft part 12. This is illustrated in dashed lines in FIG. 2 and indicated at 48. Such a configuration may provide additional support for aircraft part 12, which may be beneficial for elongate and/or flexible aircraft parts 12. However, such a configuration also may cause systems 30 to image both aircraft part 12 and part fixture 40.

With this in mind, and in some examples, part fixture 40 may include, may be defined by, and/or may be fully defined by a fixture material that is transmissive to x-rays, that is at least substantially transmissive to x-rays, that is transparent to x-rays, and/or that is at least substantially transparent to x-rays. Stated another way, the fixture material of part fixture 40 may be selected such that the x-rays do not interact with, or only minimally interact with, the part fixture, thereby decreasing the potential for artifacts and/or noise, due to the presence of part fixture 40, within the images generated by systems 30. Examples of fixture material include a nonmetallic material, a composite material, and/or a fiberglass. In some examples, fixture material may have and/or define a dielectric constant that is within a threshold dielectric constant range. Examples of the threshold dielectric constant range include dielectric constants of at least 1.4, at least 1.6, at least 1.8, at least 2, at least 2.2, at least 2.4, at least 2.6, at most 5, at most 4.5, at most 4, at most 3.8, at most 3.6, at most 3.4, at most 3.2, at most 3, at most 2.8, at most 2.6, at most 2.4, and/or at most 2.2.

X-ray source 50 may include any suitable structure that may be adapted, configured, designed, and/or constructed to selectively emit x-rays, such as along beam path 52. In some examples, and as collectively illustrated by FIGS. 2-3, x-ray source 50 may include an x-ray emitter 54 and a power supply 56, which may be configured to electrically power x-ray emitter 54. In some such examples, power supply 56 may be configured to electrically power x-ray emitter 54 at an emitter voltage, examples of which include voltages of at least 200 kilovolts (kV), at least 250 kV, at least 300 kV, at least 350 kV, at least 400 kV, at least 450 kV, at most 600 kV, at most 550 kV, at most 450 kV, at most 400 kV, and/or at most 350 kV. Additionally or alternatively, power supply 56 may be configured to electrically power x-ray emitter 54 at an emitter current, examples of which include currents of at least 1.0 milliamp (mA), at least 1.2 mA, at least 1.4 mA, at least 1.6 mA, at least 1.8 mA, at least 2.0 mA, at least 2.2 mA, at least 2.4 mA, at least 2.6 mA, at least 2.8 mA, at least 3.0 mA, at most 5.0 mA, at most 4.8 mA, at most 4.6 mA, at most 4.4 mA, at most 4.2 mA, at most 4.0 mA, at most 3.8 mA, at most 3.6 mA, at most 3.4 mA, at most 3.2 mA, and/or at most 3.0 mA.

X-ray detector 60 may include any suitable structure that may be adapted, configured, designed, and/or constructed to detect x-rays that may be incident thereupon and/or to quantify any suitable property and/or characteristic of the x-rays. Examples of the property and/or characteristic of the x-rays include a frequency of the x-rays, a wavelength of the x-rays, an amplitude of the x-rays, an intensity of the x-rays, a phase of the x-rays, a polarization of the x-rays, and/or a change in any of these parameters caused when the x-rays pass through the aircraft part. In some examples, x-ray detector 60 may include and/or be a high-resolution x-ray detector 60. Stated another way, x-ray detector 60 may have a spatial resolution, or may permit and/or facilitate generation of two and/or three-dimensional images of aircraft part 12 with a spatial resolution of at least 80 micrometers ($\mu$m), at least 90 $\mu$m, at least 100 $\mu$m, at least 110 $\mu$m, at least 120 $\mu$m, at least 130 $\mu$m, at least 140 $\mu$m, at least 150 $\mu$m, at least 160 $\mu$m, at least 170 $\mu$m, at least 180 $\mu$m, at least 190 $\mu$m, at least 200 $\mu$m, at most 300 $\mu$m, at most 280 $\mu$m, at most 260 $\mu$m, at most 240 $\mu$m, at most 220 $\mu$m, at most 200 $\mu$m, at most 190 $\mu$m, at most 180 $\mu$m, at most 170 $\mu$m, at most 160 $\mu$m, and/or at most 150 $\mu$m.

Support structure 70 may include any suitable structure that may be adapted, configured, designed, and/or constructed to support both x-ray source 50 and x-ray detector 60, to orient x-ray source 50 and/or x-ray detector 60 such that beam path 52 is incident upon x-ray detector 60 from x-ray source 50, and/or to orient x-ray source 50 and x-ray detector 60 such that beam path 52 extends through aircraft part 12. In some examples, and as illustrated in FIG. 3, support structure 70 may include and/or be a circular, an at least substantially circular, and/or an at least partially circular support structure 70.

In some examples, support structure 70 may be configured to maintain a fixed, or at least substantially fixed, relative orientation between x-ray source 50 and x-ray detector 60. This may include maintaining the fixed relative orientation while support structure 70 rotates about scan axis 110 and/or translates along scan axis 110. With this in mind, support structure 70 may include and/or be a rigid, or an at least substantially rigid, support structure 70.

In some examples, and as perhaps best illustrated in FIG. 3, support structure 70 may include and/or may define an opening 72. In some such examples, support structure 70 may extend around, may extend circumferentially around, may at least partially surround, and/or may at least partially encircle opening 72. Opening 72 may be configured to receive aircraft part 12 such that beam path 52 extends through the aircraft part when the aircraft part is supported by part fixture 40. Stated another way, aircraft part 12 may extend within opening 72 when the aircraft part is scanned and/or imaged by systems 30. Stated yet another way, beam path 52 may extend across, or may span, opening 72.

Rotary scanning structure 80 may include any suitable structure that may be adapted, configured, designed, and/or constructed to selectively rotate support structure 70 about scan axis 110. Stated another way, rotary scanning structure 80 may be configured to rotate, or to selectively rotate, support structure 70 within a rotation plane that is perpendicular to scan axis 110, that is at least substantially perpendicular to scan axis 110, that extends through x-ray source 50, that extends through x-ray detector 60, and/or that extends through aircraft part 12. An example of the rotation plane includes the plane defined by line 3-3 of FIG. 2, which is illustrated in FIG. 3. An example of rotary scanning structure 80 includes a rotary scan electric motor 84, such as a stepper motor and/or a servo motor.

In some examples, rotary scanning structure 80 may be adapted, configured, designed, and/or constructed to permit and/or to facilitate continuous rotation of support structure 70 about scan axis 110. As an example, rotary scanning structure 80 may be configured to facilitate rotation of support structure 70 through a rotary range-of-motion of at least 360 degrees, at least 1 rotation, at least 2 rotations, at least 3 rotations, and/or an unlimited, or any desired, number of rotations. Stated another way, rotary scanning structure 80 may be configured to facilitate unlimited rotation of support structure 70 about scan axis 110 and/or within the rotation plane.

In some examples, and as illustrated in FIG. 2, rotary scanning structure 80 may include a rotary scan controller 82. Rotary scan controller 82, when present, may be configured and/or programmed to control, to regulate, and/or to direct rotation of support structure 70 about scan axis 110.

Longitudinal scanning structure 90 may include any suitable structure that may be adapted, configured, designed, and/or constructed to selectively translate support structure 70 along scan axis 110. Stated another way, longitudinal scanning structure 90 may be configured to translate, or to selectively translate, support structure 70 in a direction that is perpendicular, or at least substantially perpendicular, to the rotation plane. An example of longitudinal scanning structure 90 includes a longitudinal scan electric motor 94, such as a stepper motor and/or a servo motor.

In some examples, longitudinal scanning structure 90 may be configured to permit and/or facilitate continuous translation of support structure 70 along at least a threshold fraction of length 28 of aircraft part 12. Examples of the threshold fraction of length 28 include at least 60%, at least 65%, at least 70%, at least 75%, at least 80%, at least 85%, at least 90%, at least 95%, at least 99%, 100%, at most 100%, at most 95%, at most 90%, at most 85%, and/or at most 80%.

In some examples, longitudinal scanning structure 90 may include a longitudinal scan controller 92. Longitudinal scan controller 92, when present, may be configured and/or programmed to control, to regulate, and/or to direct translation of support structure 70 along scan axis 110.

As illustrated in dashed lines in FIG. 2, systems 30 may include a scanning structure support frame 120. Scanning structure support frame 120, when present, may be configured to support, to constrain motion of, and/or to direct motion of support structure 70, rotary scanning structure 80, and/or longitudinal scanning structure 90. As an example, longitudinal scanning structure 90 may be operatively attached to scanning structure support frame 120, may interface with scanning structure support frame 120, and/or may operatively translate support structure 70 along scanning structure support frame 120. An example of scanning structure support frame 120 includes a rail 122, which may be positioned below aircraft part 12 and/or on a ground surface. Another example of scanning structure support frame 120 includes a gantry 124, which may be positioned beside and/or above aircraft part 12.

As discussed, and in some examples, aircraft part 12 may include and/or be elongate aircraft part 12. With this in mind, and in some examples, length 28 of aircraft part 12 may be at least 2 meters (m), at least 2.5 m, at least 3 m, at least 3.5 m, at least 4 m, at least 4.5 m, at least 5 m, at least 5.5 m, at least 6 m, at least 6.5 m, at least 7 m, at least 7.5 m, at most 20 m, at most 18 m, at most 16 m, at most 14 m, at most 12 m, at most 10 m, at most 8 m, and/or at most 6 m. Additionally or alternatively, a part aspect ratio of aircraft part 12 may be at least 2, at least 3, at least 4, at least 5, at least 6, at least 7, at least 8, at least 9, at least 10, at most 20, at most 18, at most 16, at most 14, at most 12, at most 10, and/or at most 8. The part aspect ratio may be defined as a ratio of length 28 to a maximum transverse dimension of aircraft part 12, as a ratio of length 28 to a minimum transverse dimension of aircraft part 12, and/or as a ratio of length 28 to an average maximum transverse dimension of aircraft part 12.

As discussed, systems 30 may be configured to scan at least the threshold fraction of the volume of aircraft part 12 without motion of the aircraft part. It is within the scope of the present disclosure that systems 30 may scan the threshold fraction of the volume of aircraft part 12 during a scan time period. Examples of the scan time period include time periods of at least 5 minutes, at least 10 minutes, at least 15 minutes, at least 20 minutes, at least 25 minutes, at least 30 minutes, at least 35 minutes, at least 40 minutes, at least 45 minutes, at least 50 minutes, at least 55 minutes, at least 60 minutes, at most 120 minutes, at most 110 minutes, at most 100 minutes, at most 90 minutes, at most 80 minutes, at most 70 minutes, at most 60 minutes, at most 50 minutes, and/or at most 40 minutes.

In some examples, systems 30 may be configured to permit and/or facilitate viewing of at least a region of aircraft part 12, of part fixture 40, of x-ray source 50, of x-ray detector 60, of support structure 70, of rotary scanning structure 80, and/or of longitudinal scanning structure 90 while systems 30 scan and/or image aircraft part 12. With this in mind, systems 30 may be free of an enclosure that surrounds aircraft part 12, part fixture 40, x-ray source 50, x-ray detector 60, support structure 70, rotary scanning structure 80, and/or longitudinal scanning structure 90.

As illustrated in dashed lines in FIG. 2, and in some examples, systems 30 may include a controller 100. Controller 100, when present, may be adapted, configured, designed, constructed, and/or programmed to communicate with and/or to control the operation of at least one other component of systems 30. As examples, controller 100 may be programmed to communicate with and/or to control the operation of x-ray source 50, x-ray detector 60, rotary scanning structure 80, and/or longitudinal scanning structure 90. In some such examples, power supply 56, rotary scan controller 82, and/or longitudinal scan controller 92 may form a portion of and/or may be integral to controller 100. In some examples, controller 100 may be programmed to direct systems 30 to perform any suitable step and/or steps of methods 200, which are discussed in more detail herein.

FIG. 4 is a flowchart depicting examples methods 200 of imaging an aircraft part, according to the present disclosure, such as aircraft part 12 of FIGS. 1-3. Methods 200 may be performed by an x-ray tomography system, such as x-ray tomography systems 30 of FIGS. 2-3. Methods 200 include supporting the aircraft part at 210 and scanning the aircraft part at 220.

Supporting the aircraft part at 210 may include supporting the aircraft part in a desired orientation and/or supporting the aircraft part with a part fixture. An example of the desired orientation includes a horizontal, or at least substantially horizontal, orientation. Examples of the part fixture are disclosed herein with reference to part fixture 40. In some examples, the supporting at 210 may include maintaining the aircraft part fixed in space, stationary, and/or immobile during the scanning at 220.

Scanning the aircraft part at 220 may include selectively rotating a support structure at 222 and/or selectively translating the support structure at 224. The support structure may support an x-ray source and/or an x-ray detector. Examples of the support structure are disclosed herein with reference to support structure 70 of FIGS. 2-3. Examples of the x-ray source are disclosed herein with reference to x-ray source 50 of FIGS. 2-3. Examples of the x-ray detector are disclosed herein with reference to x-ray detector 60 of FIGS. 2-3. The selectively rotating at 222 may include selectively rotating the support structure about a scan axis and/or such that a beam path from the x-ray source to the x-ray detector passes through the aircraft part. The selectively translating at 224 may include selectively translating the support structure along the scan axis. Examples of the scan axis are disclosed herein with reference to scan axis 110 of FIGS. 2-3. Examples of the beam path are disclosed herein with reference to beam path 52 of FIG. 3.

In some examples, methods 200 may include performing the supporting at 210 and/or the scanning at 220 such that the beam path is external to, or does not pass through, the part fixture during the scanning and/or during the scanning of at least a threshold fraction of a volume, or of a total volume, of the aircraft part. Examples of the threshold fraction of the volume of the aircraft part are disclosed herein.

In some examples, the scanning at 220 may include scanning during a scan time period. Examples of the scan time period are disclosed herein.

In some examples, the rotating at 222 may include rotating within a rotation plane. The rotation plane may be vertical, may be at least substantially vertical, and/or may extend perpendicular to the scan axis. The scan axis may be horizontal, or at least substantially horizontal. Additionally or alternatively, the scan axis may extend parallel to, at least substantially parallel to, and/or coaxially with a longitudinal, or elongate, axis of the aircraft part.

Illustrative, non-exclusive examples of inventive subject matter according to the present disclosure are described in the following enumerated paragraphs:

A1. An x-ray tomography system (30) for imaging an aircraft part (12), or an elongate aircraft part (12), the system (30) comprising:
    a part fixture (40) configured to support the aircraft part (12) in a desired orientation (20), or a horizontal orientation;
    an x-ray source (50) configured to selectively emit x-rays;
    an x-ray detector (60) configured to detect the x-rays;
    a support structure (70) that operatively supports the x-ray source (50) and the x-ray detector (60) such that the x-rays emitted by the x-ray source (50) travel along a beam path (52) that is incident upon the x-ray detector (60) and that passes through the aircraft part (12) when the aircraft part (12) is supported by the part fixture (40);
    a rotary scanning structure (80) configured to selectively rotate the support structure (70) about a scan axis (110); and
    a longitudinal scanning structure (90) configured to selectively translate the support structure (70) along the scan axis (110).

A2. The system (30) of paragraph A1, wherein the part fixture (40) is configured to maintain the aircraft part (12) fixed in space, optionally while the rotary scanning structure (80) rotates the support structure (70) about the scan axis (110) and further optionally while the longitudinal scanning structure (90) translates the support structure (70) along the scan axis (110).

A3. The system (30) of any of paragraphs A1-A2, wherein the aircraft part (12) extends between a first part end region (22) and a second part end region (24), and further wherein the part fixture (40) is configured to engage the first part end region (22) and the second part end region (24), and optionally only the first part end region (22) and only the second part end region (24).

A4. The system (30) of paragraph A3, wherein the part fixture (40) further includes at least one intermediate support (46) configured to engage an intermediate region (26) of the aircraft part (12), which is between the first part end region (22) and the second part end region (24).

A5. The system (30) of any of paragraphs A3-A4, wherein the part fixture (40) extends along, or along an entirety of, a length (28) of the aircraft part (12).

A6. The system (30) of any of paragraphs A1-A5, wherein the part fixture (40) is defined by a fixture material.

A7. The system (30) of paragraph A6, wherein the fixture material at least one of:
    (i) is at least substantially transmissive to the x-rays;
    (ii) is at least substantially transparent to the x-rays;
    (iii) is nonmetallic;
    (iv) is a composite material; and
    (v) is a fiberglass.

A8. The system (30) of any of paragraphs A6-A7, wherein the fixture material has a dielectric constant of at least one of:
    (i) at least 1.4, at least 1.6, at least 1.8, at least 2, at least 2.2, at least 2.4, or at least 2.6; and
    (ii) at most 5, at most 4.5, at most 4, at most 3.8, at most 3.6, at most 3.4, at most 3.2, at most 3, at most 2.8, at most 2.6, at most 2.4, or at most 2.2.

A9. The system (30) of any of paragraphs A1-A8, wherein the part fixture (40) is configured such that the beam path (52) extends external to the part fixture (40) while the system (30) scans at least a threshold fraction of a volume of the aircraft part (12), optionally wherein the threshold fraction of the volume of the aircraft part (12) is at least one of:
    (i) at least 60%, at least 65%, at least 70%, at least 75%, at least 80%, at least 85%, at least 90%, at least 95%, or at least 99%;
    (ii) 100%; and
    (iii) at most 100%, at most 95%, at most 90%, at most 85%, or at most 80%.

A10. The system (30) of any of paragraphs A1-A9, wherein the x-ray source (50) includes an x-ray emitter (54) and a power supply (56) configured to electrically power the x-ray emitter (54).

A11. The system (30) of paragraph A10, wherein the power supply (56) is configured to electrically power the x-ray emitter (54) at an emitter voltage of at least one of:
    (i) at least 200 kilovolts (kV), at least 250 kV, at least 300 kV, at least 350 kV, at least 400 kV, or at least 450 kV; and
    (ii) at most 600 kV, at most 550 kV, at most 450 kV, at most 400 kV, or at most 350 kV.

A12. The system (30) of any of paragraphs A10-A11, wherein the power supply (56) is configured to electrically power the x-ray emitter (54) at an emitter current of at least one of:
    (i) at least 1.0 milliamp (mA), at least 1.2 mA, at least 1.4 mA, at least 1.6 mA, at least 1.8 mA, at least 2.0 mA, at least 2.2 mA, at least 2.4 mA, at least 2.6 mA, at least 2.8 mA, or at least 3.0 mA; and
    (ii) at most 5.0 mA, at most 4.8 mA, at most 4.6 mA, at most 4.4 mA, at most 4.2 mA, at most 4.0 mA, at most 3.8 mA, at most 3.6 mA, at most 3.4 mA, at most 3.2 mA, or at most 3.0 mA.

A13. The system (30) of any of paragraphs A1-A12, wherein the x-ray detector (60) is configured to detect the x-rays at a spatial resolution of at least one of:
    (i) at least 80 micrometers (μm), at least 90 μm, at least 100 μm, at least 110 μm, at least 120 μm, at least 130 μm, at least 140 μm, at least 150 μm, at least 160 μm, at least 170 μm, at least 180 μm, at least 190 μm, or at least 200 μm; and
    (ii) at most 300 μm, at most 280 μm, at most 260 μm, at most 240 μm, at most 220 μm, at most 200 μm, at most 190 μm, at most 180 μm, at most 170 μm, at most 160 μm, or at most 150 μm.

A14. The system (30) of any of paragraphs A1-A13, wherein the support structure (70) is a circular, or at least substantially circular, support structure (70).

A15. The system (30) of any of paragraphs A1-A14, wherein the support structure (70) is configured to maintain a fixed relative orientation between the x-ray source (50) and the x-ray detector (60).

A16. The system (30) of any of paragraphs A1-A15, wherein the support structure (70) includes an opening (72) configured to receive the aircraft part (12) such that the beam path (52) extends through the aircraft part (12) when the aircraft part (12) is supported by the part fixture (40).

A17. The system (30) of paragraph A16, wherein the support structure (70) extends circumferentially around the opening (72).

A18. The system (30) of any of paragraphs A1-A17, wherein the rotary scanning structure (80) is configured to selectively rotate the support structure (70) within a rotation plane that extends through both the x-ray source (50) and the x-ray detector (60).

A19. The system (30) of any of paragraphs A1-A18, wherein the rotary scanning structure (80) is configured to facilitate continuous rotation of the support structure (70) about the scan axis (110) and through a rotary range-of-motion of at least 360 degrees.

A20. The system (30) of any of paragraphs A1-A19, wherein the rotary scanning structure (80) is configured to facilitate unlimited rotation of the support structure (70) about the scan axis (110).

A21. The system (30) of any of paragraphs A1-A20, wherein the rotary scanning structure (80) includes a rotary scan controller (82) configured to control rotation of the support structure (70) about the scan axis (110).

A22. The system (30) of any of paragraphs A1-A21, wherein the rotary scanning structure (80) includes a rotary scan electric motor (84).

A23. The system (30) of any of paragraphs A1-A22, wherein the longitudinal scanning structure (90) is configured to facilitate continuous translation of the support structure (70) along at least a threshold fraction of a/the length (28) of the aircraft part (12).

A24. The system (30) of paragraph A23, wherein the threshold fraction of the length (28) of the aircraft part (12) includes at least one of:
(i) at least 60%, at least 65%, at least 70%, at least 75%, at least 80%, at least 85%, at least 90%, at least 95%, or at least 99%;
(ii) 100%; and
(iii) at most 100%, at most 95%, at most 90%, at most 85%, or at most 80%.

A25. The system (30) of any of paragraphs A1-A24, wherein the longitudinal scanning structure (90) includes a longitudinal scan controller (92) configured to control translation of the support structure (70) along the scan axis (110).

A26. The system (30) of any of paragraphs A1-A25, wherein the longitudinal scanning structure (90) includes a longitudinal scan electric motor (94).

A27. The system (30) of any of paragraphs A1-A26, wherein the system (30) includes the aircraft part (12).

A28. The system (30) of any of paragraphs A1-A27, wherein the aircraft part (12) includes, is, or is composed of at least one of:
(i) a composite structure; and
(ii) a fiber-reinforced composite material.

A29. The system (30) of any of paragraphs A1-A28, wherein the aircraft part (12) includes a plurality of fibers (16) and a resin material (18).

A30. The system (30) of any of paragraphs A1-A29, wherein the aircraft part (12) includes, or is, at least one of:
(i) an aircraft edge structure (14);
(ii) an advanced aircraft edge structure (14); and
(iii) an aerodynamic surface (13) of the aircraft.

A31. The system (30) of any of paragraphs A1-A30, wherein a/the length (28) of the aircraft part (12) is at least one of:
(i) at least 2 meters (m), at least 2.5 m, at least 3 m, at least 3.5 m, at least 4 m, at least 4.5 m, at least 5 m, at least 5.5 m, at least 6 m, at least 6.5 m, at least 7 m, or at least 7.5 m; and
(ii) at most 20 m, at most 18 m, at most 16 m, at most 14 m, at most 12 m, at most 10 m, at most 8 m, or at most 6 m.

A32. The system (30) of any of paragraphs A1-A31, wherein the aircraft part (12) defines a part aspect ratio of at least one of:
(i) at least 2, at least 3, at least 4, at least 5, at least 6, at least 7, at least 8, at least 9, or at least 10; and
(ii) at most 20, at most 18, at most 16, at most 14, at most 12, at most 10, or at most 8.

A33. The system (30) of any of paragraphs A1-A32, wherein the system (30) is configured to scan at least a threshold fraction of a/the volume of the aircraft part (12) without motion of the aircraft part (12).

A34. The system (30) of paragraph A33, wherein the threshold fraction of the volume of the aircraft part (12) is at least one of:
(i) at least 60%, at least 65%, at least 70%, at least 75%, at least 80%, at least 85%, at least 90%, at least 95%, or at least 99%;
(ii) 100%; and
(iii) at most 100%, at most 95%, at most 90%, at most 85%, or at most 80%.

A35. The system (30) of any of paragraphs A33-A34, wherein the system (30) is configured to scan the threshold fraction of the volume of the aircraft part (12) during a scan time period of at least one of:
(i) at least 5 minutes, at least 10 minutes, at least 15 minutes, at least 20 minutes, at least 25 minutes, at least 30 minutes, at least 35 minutes, at least 40 minutes, at least 45 minutes, at least 50 minutes, at least 55 minutes, or at least 60 minutes; and
(ii) at most 120 minutes, at most 110 minutes, at most 100 minutes, at most 90 minutes, at most 80 minutes, at most 70 minutes, at most 60 minutes, at most 50 minutes, or at most 40 minutes.

A36. The system (30) of any of paragraphs A1-A35, wherein the system (30) is free of an enclosure that surrounds either of the x-ray source (50) and the x-ray detector (60).

A37. The system (30) of any of paragraphs A1-A36, wherein the system (30) further includes a controller (100) programmed to control the operation of at least one other component of the system (30).

A38. The system (30) of paragraph A37, wherein the controller (100) is programmed to control the operation of at least one of:
(i) the x-ray source (50);
(ii) the x-ray detector (60);
(iii) the rotary scanning structure (80); and
(iv) the longitudinal scanning structure (90).

A39. The system (30) of any of paragraphs A37-A38, wherein the controller (100) is programmed to direct the system (30) to perform any suitable step of any of the methods (200) of any of paragraphs B1-B8.

B1. A method (200) of imaging an aircraft part (12), or an elongate aircraft part (12), utilizing an x-ray tomography system (30), the method (200) comprising:
supporting (210) the aircraft part (12) in a desired orientation (20), or a horizontal orientation, with a part fixture (40); and
scanning (220) the aircraft part (12) by:
(i) selectively rotating (222) a support structure (70), which supports an x-ray source (50) and an x-ray detector (60), about a scan axis (110) and such that a beam path (52) from the x-ray source (50) to the x-ray detector (60) passes through the aircraft part (12); and
(ii) selectively translating (224) the support structure (70) along the scan axis (110).

B2. The method (200) of paragraph B1, wherein the supporting (210) includes maintaining the aircraft part (12) fixed in space during the scanning (220).

B3. The method (200) of any of paragraphs B1-B2, wherein the beam path (52) is external to the part fixture (40)

during the scanning of at least a threshold fraction of a volume of the aircraft part (12).

B4. The method (200) of paragraph B3, wherein the threshold fraction of the volume of the aircraft part (12) is at least one of:

(i) at least 60%, at least 65%, at least 70%, at least 75%, at least 80%, at least 85%, at least 90%, at least 95%, or at least 99%;

(ii) 100%; and (iii) at most 100%, at most 95%, at most 90%, at most 85%, or at most 80%.

B5. The method (200) of any of paragraphs B1-B4, wherein the scanning (220) includes scanning during a scan time period of at least one of:

(i) at least 5 minutes, at least 10 minutes, at least 15 minutes, at least 20 minutes, at least 25 minutes, at least 30 minutes, at least 35 minutes, at least 40 minutes, at least 45 minutes, at least 50 minutes, at least 55 minutes, or at least 60 minutes; and (ii) at most 120 minutes, at most 110 minutes, at most 100 minutes, at most 90 minutes, at most 80 minutes, at most 70 minutes, at most 60 minutes, at most 50 minutes, or at most 40 minutes.

B6. The method (200) of any of paragraphs B1-B5, wherein the selectively rotating (222) includes selectively rotating within a rotation plane that is vertical, or at least substantially vertical.

B7. The method (200) of any of paragraphs B1-B6, wherein the scan axis (110) is at least substantially horizontal.

B8. The method (200) of any of paragraphs B1-B7, wherein the method (200) includes performing the method (200) with any suitable structure of any of the systems (30) of any of paragraphs A1-A39.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. An x-ray tomography system for imaging an aircraft part, the system comprising:
    a part fixture configured to support the aircraft part in a desired orientation;
    an x-ray source configured to selectively emit x-rays;
    an x-ray detector configured to detect the x-rays;
    a support structure that operatively supports the x-ray source and the x-ray detector such that the x-rays emitted by the x-ray source travel along a beam path that is incident upon the x-ray detector and that passes through the aircraft part when the aircraft part is supported by the part fixture;
    a rotary scanning structure configured to selectively rotate the support structure about a scan axis; and
    a longitudinal scanning structure configured to selectively translate the support structure along the scan axis;
    wherein the aircraft part extends between a first part end region and a second part end region; and
    wherein the part fixture is configured to engage only the first part end region and the second part end region.

2. The system of claim 1, wherein the part fixture is configured to maintain the aircraft part fixed in space while the rotary scanning structure rotates the support structure about the scan axis and also while the longitudinal scanning structure translates the support structure along the scan axis.

3. The system of claim 1, wherein the part fixture is defined by a fixture material, wherein the fixture material at least one of:
    (i) is at least substantially transmissive to the x-rays;
    (ii) is nonmetallic;
    (iii) is a composite material; and
    (iv) is a fiberglass.

4. The system of claim 1, wherein the part fixture is configured such that the beam path extends external to the part fixture while the system scans at least 75% of a volume of the aircraft part.

5. The system of claim 1, wherein the x-ray source includes an x-ray emitter and a power supply configured to electrically power the x-ray emitter.

6. The system of claim 5, wherein the power supply is configured to electrically power the x-ray emitter at an emitter voltage of at least 200 kilovolts (kV).

7. The system of claim 5, wherein the power supply is configured to electrically power the x-ray emitter at an emitter current of at most 5.0 milliamp (mA).

8. The system of claim 1, wherein the x-ray detector is configured to detect the x-rays at a spatial resolution of at least one of at least 80 micrometers (μm) and at most 300 μm.

9. The system of claim 1, wherein the support structure is configured to maintain a fixed relative orientation between the x-ray source and the x-ray detector.

10. The system of claim 1, wherein the support structure includes an opening configured to receive the aircraft part such that the beam path extends through the aircraft part when the aircraft part is supported by the part fixture.

11. The system of claim 1, wherein the rotary scanning structure is configured to facilitate unlimited rotation of the support structure about the scan axis.

12. The system of claim 1, wherein the longitudinal scanning structure is configured to facilitate continuous translation of the support structure along at least 75% of a length of the aircraft part.

13. The system of claim 1, wherein the system is free of an enclosure that surrounds either of the x-ray source and the x-ray detector.

14. The system of claim 1, wherein the system further includes a controller programmed to control the operation of at least one of:
    (i) the x-ray source;
    (ii) the x-ray detector;
    (iii) the rotary scanning structure; and
    (iv) the longitudinal scanning structure.

15. A method of imaging an aircraft part utilizing an x-ray tomography system, the method comprising:
    supporting the aircraft part in a desired orientation with a part fixture, wherein the aircraft part extends between a first part end region and a second part end region; and further wherein the supporting includes engaging only the first part end region and the second part end region with the part fixture; and
    scanning the aircraft part by:
    (i) selectively rotating a support structure, which supports an x-ray source and an x-ray detector, about a scan axis and such that a beam path from the x-ray source to the x-ray detector passes through the aircraft part; and
    (ii) selectively translating the support structure along the scan axis.

16. The method of claim 15, wherein the supporting includes maintaining the aircraft part fixed in space during the scanning.

17. The method of claim 15, wherein the selectively rotating includes selectively rotating within a rotation plane that is at least substantially vertical.

18. The method of claim 15, wherein the scan axis is at least substantially horizontal.

19. The method of claim 15, wherein the part fixture is configured such that, during the scanning, the beam path extends external to the part fixture while the x-ray tomography system scans at least 75% of a volume of the aircraft part.

20. The method of claim 15, wherein the scanning includes electrically powering an x-ray emitter of the x-ray source at an emitter voltage of at least 200 kilovolts (kV).

* * * * *